Patented Jan. 30, 1934

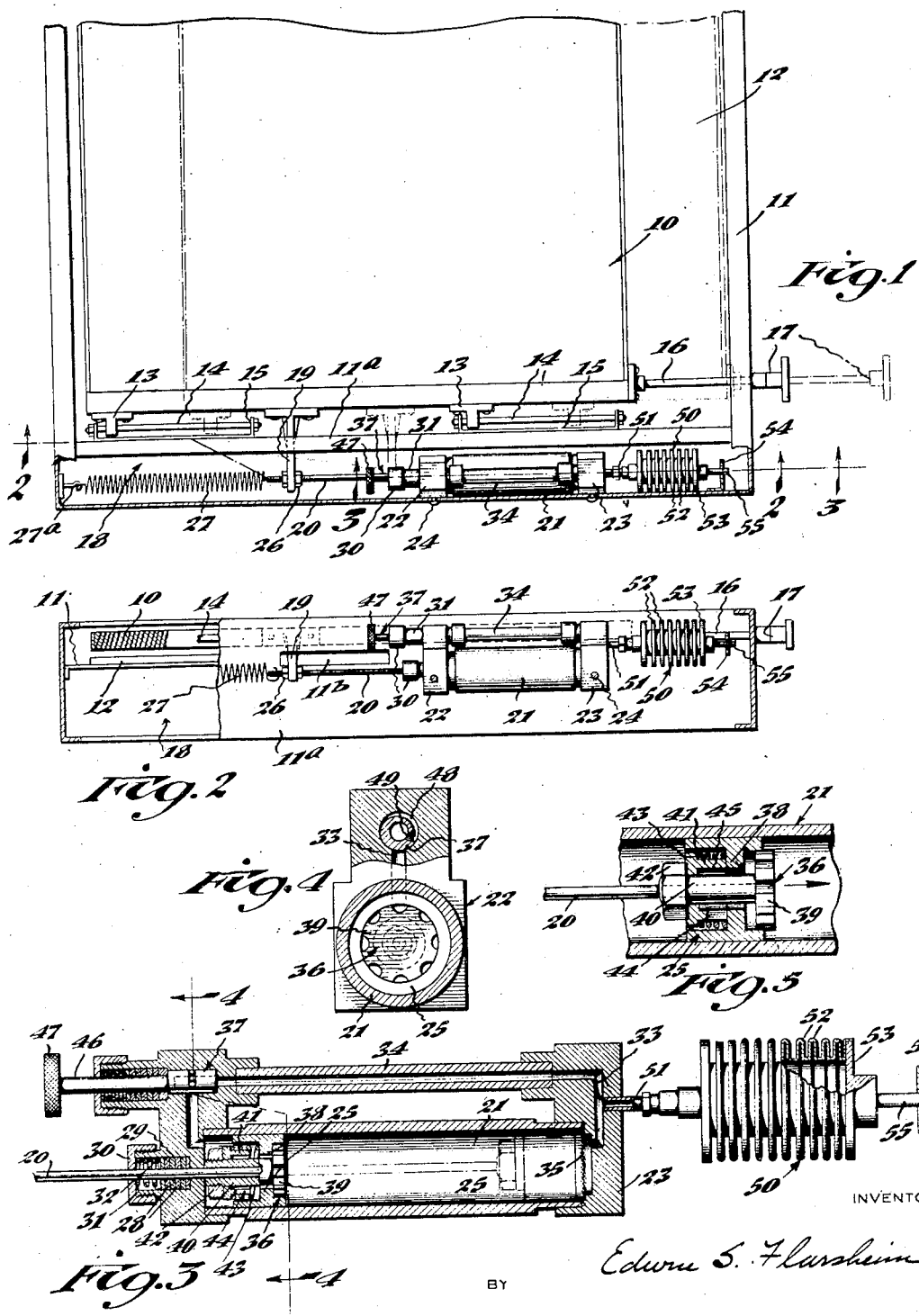

1,945,499

UNITED STATES PATENT OFFICE 1,945,499

BUCKY GRID ACTUATING DEVICE

Edwin S. Flarsheim, Cincinnati, Ohio, assignor to The Liebel-Flarsheim Company, Cincinnati, Ohio, a corporation of Ohio Application March 2, 1932. Serial No. 596,300

10 Claims. (Cl. 250—34)

This invention relates to X-ray apparatus and particularly to mechanism for regulating the speed of travel of bucky grids which are conventionally interposed between the subject matter being X-rayed and the sensitized plate to screen out secondary radiation.

The grid is moved above and across the sensitized plate while the picture is being taken and the opaque strips, usually lead strips, accomplish the specified screening function. It is desirable that a predetermined motion be imparted to the bucky grids in the travel across the sensitized plate and it has been conventional in the past to accomplish this motion by means of an actuating instrumentality such as a weight or a spring in combination with dash-pot mechanism adapted to determine and equalize somewhat the rate of travel of the grids.

In the disclosed embodiment of the present invention, the X-ray table, bucky grid, plate-holding devices, and spring are of conventional order and the novelty resides in the mechanism for determining and controlling the speed of travel of the grid. It has been conventional in the past to utilize a cylinder containing a fluid or preferably a liquid, a piston in the cylinder operatively connected to the bucky grid and a by-pass around the piston, said by-pass adjustably constricted so that the rate of travel of the grid may be set and determined. This invention embraces these well-known and conventional elements, but also includes one new element and modification and re-arrangements of the old elements to co-operate with the new element to perform the desired functions to better advantage.

It is conventional practice to use a good grade of mineral oil as the liquid in the system. Oil expands and contracts very appreciably responsively to temperature changes. If a closed system is attempted, the expansion of the oil causes it to leak about the piston rod packing in hot weather and likewise causes the sucking of air on a fall of temperature which incorporates the air in the oil system and destroys the uniformity of operation of the device.

If an open system is attempted embracing an oil stand pipe or the like, there is danger of the oil spilling in shipment or in use, dust or other foreign matter getting into the oil, or of its viscosity or characteristics changing due to absorption of moisture or the like.

In devices of this type in the past it has been conventional to provide the piston with two piston rods of equal diameter, each extending through an end of the cylinder so that the cubical contents of the system be not changed by the motion of the piston one way or the other. This has involved the use of two packing glands, one at each end of the cylinder. It has been found impossible in practice to pack these glands sufficiently tightly to prevent all leakage of oil due to the fact that the nature of the device and the nature of its use permits the application of only so much total pressure or friction to the piston rods. In the device of the present invention, the piston has connected to it but one rod of relatively small diameter. The use of the one rod permits the application of a very tight and effective packing without increasing the total friction incidental to the motion of the piston beyond entirely tolerable limits.

The change in the cubical contents of the system, occasioned by the ingress of the piston rod, is provided for by the use of a metal bellows connected to the system and entirely filled with oil, or whatever liquid may be chosen for use in the system. The use of the metal bellows likewise permits expansion and contraction of the oil in the system without inducing leakage.

From the foregoing discussion it will be obvious to the skilled in the art that the object of this invention is to provide a device for the control of the motion of a bucky grid which will operate more uniformly than those previously used and which will solve the problems previously encountered as outlined above.

Other objects and further advantages will be more fully apparent from a description of the accompanying drawing, in which:

Figure 1 is a fragmentary top plan view of one end of the bucky grid assembly showing its operating mechanism.

Figure 2 is a sectional view taken on line 2—2, Figure 1.

Figure 3 is a sectional view taken on line 3—3, Figure 1, illustrating the bucky grid operating unit or system in detail.

Figure 4 is a sectional view taken on line 4—4, Figure 3, illustrating the control valves of the system.

Figure 5 is an enlarged fragmentary sectional view taken from Figure 3 for further detailing the automatically operating by-pass in the piston of the system.

The bucky grid 10 is not shown relative to the X-ray lamp and its detailed arrangement relative to the sensitized plate and table are not fully illustrated since this mechanism is well understood in the art and is conventional. For the purpose of this invention, the bucky grid 10 is shown slidably mounted in the frame 11 for movement above and across the sensitized plate 12 lying underneath. Referring specifically to the drawing, the bucky grid includes two lugs 13 at each end (only one end being herein illustrated). These lugs are slidably mounted on respective rods 14 carried by brackets 15 of the frame.

As shown in Figure 1, the bucky grid 10 is manually set or moved on its slide mounting for operation or automatic governed return by means of a lever 16 consisting of a rod attached to the side of the bucky grid and slidably extended through the side of the table and a knob 17 on its outer end.

The frame 11 includes a cross rail 11ª at the end 13 containing the actuating mechanism, this rail carrying the brackets 15 slidably supporting the bucky grid. This rail defines a space within the end of the frame within which the entire operating mechanism is housed. An arm 19 extends from the end of the bucky grid through a slot 11ᵇ in the rail and is operatively connected to the outer end of the piston rod 20.

A cylinder 21 including cylinder heads 22, 23, respectively, is attached to the end wall of the frame by means of screws 24 entered through the frame into the cylinder heads. The piston rod 20 extending from the piston 25 through the cylinder head 22 is screw-threaded at its outer end and a pair of nuts 26 adjustably secure the arm 19 thereto. A spring 27 is secured under tension between the end of the piston rod and a hook 27ª attached on the frame in perfect alignment with the piston rod for exerting a return action on the bucky grid through the arm connection after the bucky grid is set for operation.

The piston rod, it will be noted, extends through one end of the cylinder only and is of extremely small diameter or small cross section. This light rod is possible due to the fact that the return force as imparted by the spring is a pull force and there is no tendency to buckle the rod or destroy its alignment. Moreover, it is easier to pack this light rod in the cylinder head for there is less area or leakage surface. For the purpose of this packing, a plurality of washers 28 preferably of leather are disposed snugly about the rod within a concentric recess 29 in the cylinder head 22. A nut 30 is screwed onto a boss 31 and urges a spring 32 under compression against these washers tending to press and expand them within the recess 29 and against the piston rod.

For the purpose of the by-passage of the fluid preferably oil, the cylinder heads are extended laterally and each extension includes a passageway 33. A pipe 34 is attached between the lateral extensions and connects the passageways. Since the passageways 33 are in connection with the cylinder this pipe establishes a circuitous path or by-passage for the fluid. The cylinder 21, heads 22, 23, and pipe 34 are held in assembly with the cylinder and pipe maintained in socketed position in the heads by means of the attachment of the heads to the frame. A filter screen 35 is interposed in the fluid passage between the head 23 and the cylinder.

Two valves are inserted in the fluid passage. One is a fluid displacement control valve 36 and is included in the piston 25 for automatically opening a passage through the piston to permit idle flow of oil therethrough when the piston is being set by setting of the bucky grid. The other is a manually operated by-pass control valve 37 mounted in the extension of the cylinder head 22 in the fluid passageway and is for the purpose of permitting bucky grid movement governing by-passage of oil as the spring acts to return the piston and bucky grid.

The valve 36 in the piston is illustrated in detail in Figure 5. In this view it is open as the piston is being set and in Figure 3 it is closed as the spring is acting. The valve element 36 is rigidly attached or carried on the inner end of the piston rod and constitutes the connection of the piston rod to the piston. The piston includes a bore having a shoulder 38 or internal flange included intermediate the bore length. The valve element 36 has a head 39 having a serrated or grooved periphery for fluid passage (see Figure 4.) The head 39 of the valve element is slidably mounted in the end of the bore opposite to the extent of the piston rod and a sleeve portion 40 of the valve element is extended loosely through the piston, clearing the bore at the internal flange 38.

A sleeve element or spring retainer 41 is maintained on the end of the sleeve at the end opposite its head by means of a nut 42 on the valve element. This sleeve element or spring retainer 41 includes a head engaged against a compressed spring 43 seated against the internal flange of the piston. The head of the spring retainer clears the piston bore and longitudinal slots 44, in the opposite end thereof entering an enlarged bore portion 45 of the spring retainer, open the fluid passage through the piston when the valve is open or unseated.

Therefore, when setting of the bucky grid occurs it moves the piston rod and the piston rod is not effective for moving the piston until the valve element has been moved within the piston and unseated and the spring retainer has engaged the piston. Thereafter, the piston may be moved to set position due to the relief of fluid therethrough although the manual control by-pass valve 37 is closed at the time.

The valve 37 is of rotatable type including a stem 46 carrying a knob 47 on its outer end and the valve body mounted in the passageway in an enlarged chamber thereof. The valve body is tubular and is closed at its inner end, its bore being aligned with the passage portion extending to the pipe 34. The lateral passageway portion 33 enters the valve chamber at right angles thereto. A circumferentially tapered groove 48 is formed in the valve body adjacent the passageway 33 and a radial aperture 49 connects the groove to the bore of the valve body. The valve stem is sealed in the cylinder head at the point where it extends to the exterior by means of a packing identical to that used for the piston rod.

Therefore, rotation of the valve body will cause registration of the groove with the passageway 33 and permit passage of fluid through the by-pass via the aperture 49. This valve is manually arbitrarily opened after the bucky grid has been set and the picture taking is initiated for permitting a slow feed of the piston and movement of the grid as caused by the action of the spring and as permitted by the by-passage of fluid through the valve 37.

In view of the fact that as the piston rod enters the cylinder, assuming a closed system entirely filled with fluid or preferably a liquid, a portion of the cubical content of the system is taken up and there must then be some provision made for the displaced fluid. That is to say, the fluid system must be expansible and contractible to accommodate for the movement of the piston rod within the cylinder. This adaptability is also necessary to accommodate for temperature changes in the fluid causing contraction and expansion of the fluid.

For accomplishing the above results a metal bellows 50 is used. This bellows is attached to the cylinder head 23 and communicates with the passage 33 and therefore the fluid system by means of a nipple 51. For the bellows a plurality of annular folds 52 are formed of sheet metal and a head 53 is attached at each end. A bracket 54 supports the outer end of the bellows by means of the slidable engagement of a stud 55 extended from and concentric through the head 52 through the bracket. Expansion and contraction of the bellows is permitted by the slidable support.

Therefore, the fluid system is flexible despite its sealed condition and the problems arising from the use of a piston rod extending only from one end of the cylinder and the expansion and contraction of oil as occasioned by temperature change are taken care of.

Having described my invention, I desire to be limited only by the ensuing claims:

1. A mechanism for controlling the speed of motion of a bucky grid, comprising, a cylinder, a piston in said cylinder, a passageway connecting between the ends of said cylinder, a rod connected to said piston and extending through one end of said cylinder only, packing about said rod adapted to prevent leakage of a liquid in the cylinder, and a metal bellows in connection with the interior of said cylinder, said cylinder, passageway, and metal bellows substantially completely filled with liquid normally at substantially atmospheric pressure.

2. A mechanism for controlling the speed of motion of a bucky grid as a carriage, comprising, a liquid containing cylinder, a piston in said cylinder, the respective ends of said cylinder in communication through a passageway, an adjustable flow restricting device in said passageway, and an expansible member in communication with said passageway between the adjustable flow restricting device and the end of the cylinder from which the piston moves in its controlling stroke, said cylinder, passageway, and expansible member being substantially completely filled with liquid.

3. A mechanism for controlling the speed of motion of a bucky grid, comprising, a liquid containing cylinder, a piston in said cylinder, the respective ends of said cylinder being in communication by means of a liquid filled passageway, a piston rod connected to said piston and extending through one end of said cylinder only, packing about said rod adapted to prevent leakage of the liquid in the cylinder, a restriction device in said passageway for controlling the rate of flow of the liquid therethrough, and a dilatable container in communication with the passageway between said restriction device and that end of the cylinder opposite to the end from which the piston rod extends, said cylinder, passageway, and dilatable container substantially completely filled with liquid.

4. A mechanism for controlling the speed of motion of a bucky grid as a carriage, comprising, a liquid containing cylinder, a piston in said cylinder, the respective ends of said cylinder in communication through a passageway, an adjustable flow restricting device in said passageway, and an expansible chamber in communication with said passageway between the adjustable restricting device and the end of the cylinder from which the piston moves in its controlling stroke, said passageway, cylinder, and expansible chamber entirely filled with liquid.

5. A mechanism for controlling the speed of motion of a bucky grid, comprising, a liquid containing cylinder, a piston in said cylinder, the respective ends of said cylinder being in communication by means of a liquid filled passageway, a piston rod connected to said piston and extending through one end of said cylinder only, packing about said rod adapted to prevent leakage of the liquid in the cylinder, a restriction device in said passageway for controlling the rate of flow of the liquid therethrough, and an expansible chamber in communication with a passageway between said restriction device and that end of the cylinder opposite to the end from which the piston rod extends, said passageway, cylinder, and expansible chamber entirely filled with liquid.

6. A mechanism for controlling the speed of motion of a bucky grid comprising a cylinder, a piston in said cylinder, a by-pass connecting the ends of said cylinder, a piston rod connected to said piston and extending through said cylinder, and an expansible member in liquid communication with said cylinder, said cylinder, by-pass and expansible member being substantially completely filled with liquid normally at substantially atmospheric pressure.

7. A mechanism for controlling the speed of motion of a bucky grid comprising a cylinder, a piston in said cylinder, a by-pass connecting the ends of said cylinder, a piston rod connected to said piston and extending through said cylinder, a restriction device in said by-pass for controlling the rate of flow of the liquid therethrough, and an expansible member in liquid communication with said cylinder, said cylinder, by-pass and expansible member being substantially completely filled with liquid normally at substantially atmospheric pressure.

8. A mechanism for controlling the speed of motion of a bucky grid comprising a cylinder, a piston in said cylinder, a by-pass connecting the ends of said cylinder, a piston rod connected to said piston and extending through said cylinder, the ends of said cylinder being imperforate except for the connections to said by-pass, an expansible member in liquid communication with said by-pass, said cylinder, by-pass and expansible member being substantially completely filled with liquid normally at substantially atmospheric pressure.

9. A mechanism for controlling the speed of motion of a bucky grid comprising a cylinder, a piston in said cylinder, a by-pass connecting the ends of said cylinder, a piston rod extending through one end of said cylinder only, a packing for said piston rod, said piston rod of relatively small cross section, and said packing exerting a pressure on said piston rod at a degree high enough to overcome capillary attraction of the oil for the rod, and an expansible device in liquid connection with said cylinder connected to said by-pass whereby provision is made for the liquid displaced by the ingress of the piston rod and upon the expansion and contraction of the oil, said cylinder, by-pass and expansible device being substantially completely filled with liquid.

10. A mechanism for controlling speed of motion comprising a cylinder, a piston in said cylinder, a by-pass connecting the ends of said cylinder, a piston rod connected to said piston and extending through said cylinder, an expansible member in liquid communication with said cylinder, said cylinder, by-pass and expansible member being substantially completely filled with liquid and forming an entirely closed system, said liquid normally at substantially atmospheric pressure.

EDWIN S. FLARSHEIM.